(12) United States Patent
Saadawi et al.

(10) Patent No.: US 6,940,832 B2
(45) Date of Patent: Sep. 6, 2005

(54) ROUTING METHOD FOR MOBILE INFRASTRUCTURELESS NETWORK

(75) Inventors: Tarek Saadawi, Franklin Lakes, NJ (US); Osama Hussein, Bayonne, NJ (US)

(73) Assignee: The Research Foundation of the City University of New York, New York, NY (US)

( * ) Notice: Subject to any disclaimer, the term of this patent is extended or adjusted under 35 U.S.C. 154(b) by 200 days.

(21) Appl. No.: 10/346,447

(22) Filed: Jan. 17, 2003

(65) Prior Publication Data

US 2004/0146007 A1 Jul. 29, 2004

(51) Int. Cl.[7] ............................................. H04L 12/26
(52) U.S. Cl. ........................ 370/328; 370/238; 370/338
(58) Field of Search ................................ 370/328, 238, 370/237, 338

(56) References Cited

U.S. PATENT DOCUMENTS

| | | | |
|---|---|---|---|
| 5,412,654 A | * 5/1995 | Perkins | ........................ 370/312 |
| 5,987,011 A | 11/1999 | Toh | |
| 6,304,556 B1 | 10/2001 | Haas | |
| 6,338,087 B1 | 1/2002 | Okanoue | |
| 6,535,498 B1 | * 3/2003 | Larsson et al. | ............. 370/338 |
| 6,718,394 B2 | * 4/2004 | Cain | ........................... 709/242 |

OTHER PUBLICATIONS

Elizabeth Royer et al., "A Review of Current Routing Protocols for Ad–Hoc Mobile Wireless Networks", *IEEE Personal Communications Magazine*; Apr. 1999, pp 46–55.

P. Misra, "Routing Protocols for Ad Hoc Mobile Wireless Networks", [Online] http://www.cis.ohio–state.edu/~jain/cis788–99/adhoc routnig/index.html.

C.E. Perkins et al., "Highly Dynamic Destination Sequenced Distance Vector Routing (DSDV) for Mobile Computers", *Computer Communications Review*, Oct. 1994, pp 234–244.

Charles E. Perkins et al., "Ad–hoc On–Demand Distance Vector Routing", Proceedings of the $2^{nd}$ *IEEE Workshop on Mobile Computing Systems and Applications*, New Orleans, LA, Feb. 1999, pp 90–100.

B. Bullnheimer et al., "Applying the Ant System to the Vehicle Routing Problem", Presented at the $2^{nd}$ *Metaheuristic International Conference*, Sophia–Antipolis, France (1997).

(Continued)

*Primary Examiner*—Kenneth Vanderpuye
(74) *Attorney, Agent, or Firm*—Hoffmann & Baron, LLP

(57) ABSTRACT

The present invention provides a method for selecting and routing data in an ad-hoc mobile wireless network having a plurality of Nodes including multiple sources and destinations. The method includes sending a forward control packet from a source to the destination via at least one intermediate Node at intervals of time, where the intermediate Node is randomly selected. Each of the intermediate Nodes store weights of the neighbor Nodes. When the forward control packets reach the destination Node, they are evaluated in accordance with one or more given parameters and send back as backward control packets storing the evaluation results. As each of the intermediate Nodes receive the backward control packets, the weights of the corresponding neighbor Nodes are modified based on the stored evaluation results. Similarly, as the backward control packets are received at the source Nodes and the weights of the corresponding neighbor Nodes are modified based on the stored evaluation results. Finally, a group of routing routes to the destination are selected based on the modified weights of the neighbor Nodes and data packets are send from the source to the destination via the intermediate Nodes upon selection of the group.

51 Claims, 12 Drawing Sheets

OTHER PUBLICATIONS

G. DiCaro et al., "AntNet: Distributed Stigmergetic Control for Communications Networks", *Journal of Artificial Intelligence Research,* vol. 9, pp 317–365 (1998).

G. DiCaro et al., "Two Ant Colony Algorithms For Best–Effort Routing in Datagram Networks", Proceedings of the *Tenth IASTED International Conference on Parallel and Distributed Computing and Systems (PDCS'98),* pp 541–546, IASTED/ACTA Press, (1998).

M. Dorigo et al., "Ant Colony System: A Cooperative Learning Approach to the Traveling Salesman Problem", *IEEE Transactions on Evolutionary Computation,* vol. 1, #1, pp 53–66, Apr. 1997.

T. Stutzle et al., "The MAX–MIN Ant System and Local Search for the Traveling Salesman Problem", Proceedings of the *IEEE International Conference on Evolutionary Computation (ICEC'97),* pp 309–314 (1997).

M. Dorigo et al., "The Ant Colony Optimization Meta–Heuristic, New Ideas in Optimization", *McGraw–Hill,* editor David Corne and Marco Dorigo and Fred Glover, pp 11–32 (1999).

W. J. Gutjahr, "A Generalized Convergence Result for the Graph–based Ant System Methaheuristic", *Manuscript, University of Vienna,* 2000.

W. J. Gutjahr, "ACO Algorithms with Guaranteed Convergence to the Optimal Solution", *Technical Report, University of Vienna,* ISDS 2001–02.

T. Stutzle et al., "A Short Convergence Proof for a Class of ACO Algorithms", *Technical Report, IRIDIA,* 2000–35.

\* cited by examiner

ROUTING METHOD FOR MOBILE INFRASTRUCTURELESS NETWORK

FIELD OF THE INVENTION

The present invention relates to a novel routing method specifically adapted for use with ad-hoc mobile wireless networks and, more particularly, to a routing method where communications between sources and destination mobile hosts are carried out using a probability based routing algorithm.

BACKGROUND OF THE TECHNOLOGY

In the last decades, the marketplace has focused on wireless networks, making wireless networks grow rapidly. Different technologies have been developed on a global as well as a local level. Most of these technologies depend on a centralized hierarchical fixed infrastructure, which limits both survivability and scalability, and is dependent on the pre-configuration of the network. In addition, the cost of this expensive infrastructure is a major consideration.

Recently, infrastructureless networks (known as Mobile Ad-hoc Networks (MANETs)) have been developed as a means of addressing the needs for a more flexible, durable and cost efficient network system than conventional centralized hierarchical fixed infrastructure systems offer. Nodes in MANETs can be mobile or fixed routers and can be connected by wired or wireless links using one or more different technologies. These Nodes function as routers by discovering and maintaining routes to other Nodes in the network. In contrast with infrastructured networks, in MANETs there is no need for centralized infrastructures, such as base stations or pre-configured routers (i.e., network elements). This distributed characteristic allows the system to be more durable and more scalable. MANETs are often fast, self-built, self-configured, and adaptive to dynamic changes. MANETs are useful in a large number of applications, making them particularly useful when there is no network infrastructure or such infrastructure has been destroyed. It is clear that MANETs will play a very important role in the continued development of the computing and telecommunication market.

MANETs have several characteristics. These networks have highly dynamic topology. Most of the MANETs Nodes are mobile Nodes. These Nodes move rapidly and freely. Because of this mobility, the network topology changes rapidly and unpredictably. As opposed to fixed links, MANET links, which are wireless links, have limited and variable bandwidth, higher power consumption, limited energy and higher bit error rate. In addition, these links might be bi-directional or unidirectional. A large number of the Nodes in MANETs are mobile, and most of them depend on their batteries' energy, which is limited. Hence, energy conservation and fair distribution of energy usage should be taken into consideration.

In any network, the goal of the routing algorithm is to build routes from the sources to the destinations to be used by the data. These routes should maximize network performance. To solve the routing problem in MANETs, the goal of the routing algorithm should be achieved, while taking into consideration the special network characteristics. The routing algorithm should deal with the rapid changes in the network and it should optimize more than one parameter of the quality of service parameters (QOS) in the network, such as Node energy, link bandwidth, end to end delay, queuing delay, number of hops, links' signal to noise ratio, error rate, etc.

Many routing algorithms have been developed for MANETs; these algorithms can be classified into two groups. The first group is called table driven routing algorithms (such as DSDV, CGSR, GSR, FSR, HSR, WRP, etc.). See Elizabeth Royer and C-K Toh, "A Review of Current Routing Protocols for Ad-Hoc Mobile Wireless Networks", IEEE Personal Communications Magazine, April 1999, pp. 46–55, P. Misra, "Routing Protocols for Ad Hoc Mobile Wireless Networks", (adhoc_routing.pdf). [Online]. Available: http://www.cis.ohio-state.edu/~jain/cis788–99/adhoc_routing/index.html, and C. E. Perkins and P. Bhagwat, "Highly Dynamic Destination Sequenced Distance Vector Routing (DSDV) for Mobile Computers," Computer Communications Review, pp. 234–244, October 1994. These algorithms need frequent updating for the routing tables, which increases the routing overheads.

The second group is called source initiated on demand routing algorithms (such as AODV, DSR, TORA, ABR, SSR, etc.). Most algorithms of this class depend on flooding to find the route from sources to destinations, which increase the routing overheads. See Elizabeth Royer and C-K Toh, "A Review of Current Routing Protocols for Ad-Hoc Mobile Wireless Networks", IEEE Personal Communications Magazine, April 1999, pp.46–55, P. Misra, "Routing Protocols for Ad Hoc Mobile Wireless Networks", (adhoc_routing.pdf). [Online]. Available: http://www.cis.ohio-state.edu/~jain/cis788–99/adhoc_routing/index.html, and Charles E. Perkins and Elizabeth Royer "Ad-hoc On-Demand Distance Vector Routing.", Proceedings of the $2^{nd}$ IEEE Workshop on Mobile Computing Systems and Applications, New Orleans, La., February 1999, pp. 90–100.

Most MANETs routing algorithms need a large number of routing packets to maintain routes from sources to destinations. This large routing overhead affects the scalability of the network. This large routing overhead affects the network performance because it uses a significant part of the wireless bandwidth and of the Node's energy. In addition, most of these algorithms are optimizing only one parameter, which is in most cases the number of hops. These algorithms maintain only limited number of routes, which affect the survivability of the network. Therefore, a need exists of a routing method which will solve the routing problems in MANETs and obtain high performance, adaptive, reliable and survivable network.

SUMMARY OF THE INVENTION

The present invention provides a means of forwarding information in mobile ad hoc network from a source Node (S) to a destination Node (D) using at least one, and more than likely numerous, intermediate Nodes (I). Nodes in the network are capable of changing their geographic position with respect to each other at any given time. Thus, there is a significant challenge to communicate with the D Node via the best routing path given the various dynamic parameters that are possible in such an environment. These parameters, including such things as Node energy, link bandwidths, predicted end to end delays, estimated queuing delays, number of hops or distances, links' signal to noise ratio and error rate, among others. The present invention thus, provides a communication system with enhanced efficiency in a MANET environment which includes a means to select in real time the optimal route (path) for communication.

The parameters are included in forward control packets, which is then used to evaluate the relative "weights" of the I Nodes, for the purpose of selecting a Node, which would be the best next choice in the attempt to determine the best routing path. A change of the weights of a particular Node are assigned using the parameters through an evaluation process and changed or modified through an updating sequence as information is learned about a particular Node. For example, if information regarding the battery life of a particular Node is determined to be low, the weight of that particular Node will be modified as being a less desirable route, and this information will be brought to and stored in Nodes via the control packets. Thus, until the weight of that Node is updated to make it again a desirable route, other more desirable Nodes will be chosen. The assignment of weighted parameters permits that ability to select a "best route" choice at any given time, since the parameters in the MANET are likely to be dynamically changing. Thus, the weights change accordingly as information about Nodes is evaluated and communicated to their neighbor Nodes.

In one embodiment, the message information desired to be communicated by the sender is sent from the S Node to the D Node after the best route via I Nodes is determined. In another embodiment, the message information desired to be communicated by the sender is sent from the S Node to the D Node via I Nodes simultaneously with the control packet, as the best routing path is being determined.

In yet another embodiment, the searching for routing path is biased by randomly sending trail control packets from the D Node via I Nodes to the S Node, thereby providing allowing for the collection of and evaluation of parameter data, such that updating of the weights of Nodes in the various pathways can occur in advance. The present invention overcomes the drawbacks of the previous routing algorithms by providing a probability based routing algorithm to address the MANETs routing problems and achieve good network performance.

In one embodiment of the present invention, there is provided a method for selecting a routing path in an ad-hoc mobile wireless network having a plurality of Nodes including multiple sources and destinations, the method including, sending from a source at least one forward control packet via at least one I Node to one or more destinations at intervals of time, wherein said I Node is randomly selected and each of the I Nodes storing weights for each of its neighbor Nodes, evaluating each of said forward control packets at said destinations in accordance with one or more given parameters, sending from the destination backward control packets storing evaluation results which correspond to each of the forward control packets, through the same I Nodes originally traveled by the forward control packets to the source, receiving the backward control packets at the I Nodes, modifying the weights of each of said neighbor Nodes at each of the I Nodes based on the evaluation results stored in the backward control packets, receiving said backward control packets at said S Nodes, modifying the weights of each of said neighbor Nodes at the S Node based on the evaluation results stored in the backward control packets, and selecting a group of routing paths to said destinations via said I Nodes based on the modified weights of said neighbor Nodes.

In a first alternate embodiment of the present invention, there is provided a method for sending data in an ad-hoc mobile wireless network having a plurality of Nodes including multiple sources and destinations, the method including, sending from a source at least one forward control packet storing the data to be routed, via at least one I Node to one or more destinations at intervals of time, wherein said I Node is randomly selected and each of the I Nodes storing weights for each of its neighbor Nodes, evaluating each of said forward control packets at said destinations in accordance with one or more given parameters, sending from the destination backward control packets storing evaluation results which correspond to each of the forward control packets, through the same I Nodes originally traveled by the forward control packets to the source, receiving the backward control packets at the I Nodes, modifying the weights of each of said neighbor Nodes at each of the I Nodes based on the evaluation results stored in the backward control packets, receiving said backward control packets at said S Nodes, modifying the weights of each of said neighbor Nodes at the S Node based on the evaluation results stored in the backward control packets, and sending the data to said destinations via said I Nodes based on criteria of said weights of the neighbor Nodes for said I Node.

In a second alternate embodiment of the present invention, there is provided a method for sending data in an ad-hoc mobile wireless network having a plurality of Nodes including multiple sources and destinations, the method including, sending from a source at least one forward control packet storing the data to be sent, via at least one I Node to one or more destinations at intervals of time, wherein said I Node is randomly selected and each of the I Nodes storing weights for each of its neighbor Nodes, evaluating each of said forward control packets at said destinations in accordance with one or more given parameters, sending from the destination backward control packets storing evaluation results which correspond to each of the forward control packets through the same I Nodes originally traveled by the forward control packets to the source, receiving the backward control packets at the I Nodes, modifying the weight of each of said neighbor Nodes at each of the I Nodes based on the evaluation results stored in the backward control packets, receiving said backward control packets at said S Nodes, and modifying the weights of each of said neighbor Nodes at the S Node based on the evaluation results stored in the backward control packets.

In a third alternate embodiment of the present invention, there is provided a method for biasing a routing process in an ad-hoc mobile wireless network having a plurality of Nodes including multiple sources and destinations, the method including, sending from a destination at least one trail control packet via at least one I Node at intervals of time, wherein said I Node is randomly selected and each of the I Nodes storing weights for each of its neighbor Nodes, receiving the trail control packets at the I Nodes, and modifying the weights of each of the neighbor Nodes at each of the I Nodes immediately upon receipt of the trail control packets at the I Nodes.

DETAILED DESCRIPTION OF THE TECHNOLOGY

Figure 1:
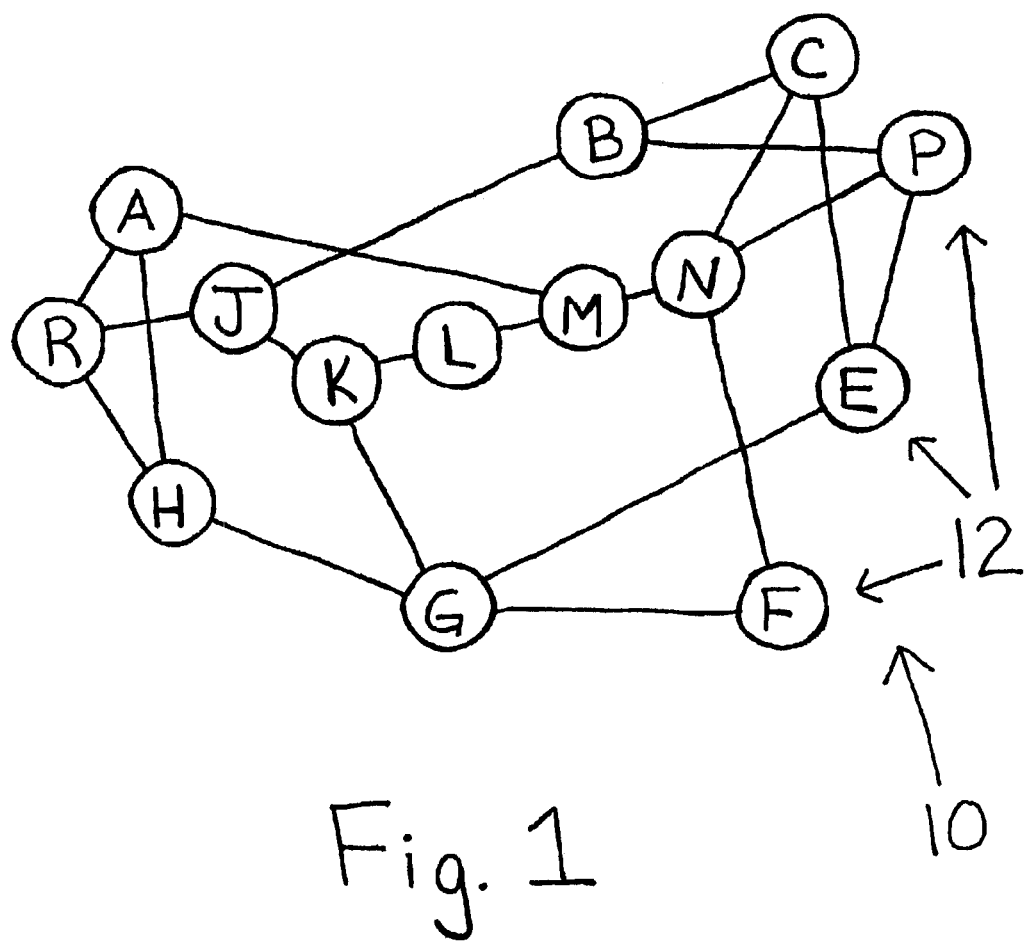
FIG. 1 is a schematic illustration of an ad-hoc mobile wireless network comprised of a plurality of Nodes which communicate with one another utilizing a probability based routing algorithm that includes a first preferred embodiment of the present invention.

For Purposes of the Present Invention, the Following Definitions Will Apply:

MANET—Mobile Ad-hoc Network is a collection of Nodes, each of which communicates over wireless channels and is capable of movement, without the required intervention of a centralized access point or existing infrastructure.

Nodes—Mobile or fixed routers with wireless receivers or wireless transmitters, which are free to move about arbitrarily.

Source (S) Nodes—Any Node in the network which transmits a forward control packet.

Intermediate (I) Nodes—Any Node in the network which receives and relays control packets and/or message information between the source Node and a destination Node.

Neighbor Nodes—Nodes located adjacent to another Node without an intervening Node there between regardless of whether a link exists between the adjacent Nodes.

Destination (D) Nodes—Any Node located in the network which is intended to be recipient of the control packet and/or message information sent by the S Nodes.

Link—A unidirectional and/or bidirectional connection between any two or more Nodes.

Message Information—Information carrying data to be relayed from an S Node to a D Node.

Routing Information—Information relating to finding a path or route between an S Node and a D Node.

Control Packet (CP)—A packet that collects and stores routing information to be transmitted from the S Node to the D Node and optionally including and transmitting message information.

Forward Control Packet (FCP)—A control packet generated at an S Node moving randomly in search of the D Node.

Backward Control Packet (BCP)—A control packet generated at a D Node upon receipt of a FCP, traveling in the direction from a D Node to an S Node visiting the same Nodes originally visited by the corresponding FCP.

Negative Backward Control Packet (NBCP)—A BCP generated at any Node upon receipt of a FCP containing one or more signals indicating unwanted path constraints, traveling towards an S Node, visiting the same Nodes originally visited by the corresponding FCP.

Trail Control Packet (TCP)—A CP generated at a D Node, moving randomly in the network.

Probability Based Routing Algorithm (PBRA)—An algorithm specifically adapted for MANETs for communications between S and D Nodes via CPs using probabilistic search for the solution.

Local Information—Relative values or weights of neighbor Nodes in a limited environment. The local information includes, without limitation, energy of the Nodes, bandwidth between the Nodes, signal to noise ratio between the Nodes, predicted delay between Nodes, estimated queuing delays, error rate of the packet transmission, power consumption of the links between Nodes, and combinations thereof.

Parameters—Predetermined characteristics or units of measures of the Nodes, which are measured to determine the weights of a Node, including the local information and global information of the Nodes from the S Node to a D Node.

Weights—Assigned levels or values of the parameters at each Node, capable of being detected and modified.

Identity Information—Identification of an individual Node that distinguishes one Node from another.

Measured Information—Relative values of the parameters of the Nodes visited.

Unwanted Path Constraints—Problems detected or encountered by the FCP as it visits Node-to-Node. Constraints include, without limitation, link failure, long routes, loop detection, security alert and unidirectional links.

Evaluation Results—Evaluation or grading of the Measured Information carried by a FCP at the D Node.

Weight Table—A table having the weights corresponding to a particular Nodes' neighbor Nodes. It has an entry corresponding to each required destination. Each entry has a field for each of the neighbor.

Probability Routing Table (PRT)—A table created using values calculated using the weight table and the local information using the PBRA. It has an entry corresponding to each required destination. Each entry has a field for each of the neighbor Nodes.

Route—A path followed or to be followed by a packet.

Referring to FIG. 1, there is shown a portion of a mobile ad-hoc network 10, that includes a plurality of conventional Nodes 12 labeled A, B, C, D, E, F, G, H, etc., each of which communicates over wireless channels and is free to move about arbitrarily. Nodes 12 participating in such ad-hoc networks 10 may preferably be located in or on airplanes, ships, trucks, cars, perhaps even on people or very small devices, and there may be multiple hosts per router. Such devices include laptops, cell phones, PDAs and other various wireless transmitting and receiving devices. Nodes 10 are equipped with wireless transmitters and receivers using antennas which may be omnidirectional (broadcast), highly-directional (point-to-point), possibly steerable, or some combination thereof. At a given point in time, depending on the Nodes' positions and their transmitter and receiver coverage patterns, transmission power levels and co-channel interference levels, a wireless connectivity in the form of a random, multihop graph or "ad-hoc" network exists between the Nodes. This ad-hoc topology may change with time as the Nodes move or adjust their transmission and reception parameters.

Every Node 12 in the network 10 can function as a S Node, such as, A, B, C, E, F, G . . . , which desirably transmits message information across the network 10, a D Node, which is the intended recipient of the information, and the I Nodes, which are configurable to relay the routing information and the message information between the S Node and the D Node. Routing information relates to finding a path (route) between an S Node and a D Node and message information includes the data transmitted from the S Node to a D Node, such data including voice or speech, text, image, etc. For the sake of clarity, the direction from the S Node to the D Node will be referred to as forward and the direction from the D Node to the S Node as backward. Generally, the forward direction is to a randomly selected Node visited for the first time by an FCP. The backward direction is to a Node previously visited by an FCP.

Figure 2:
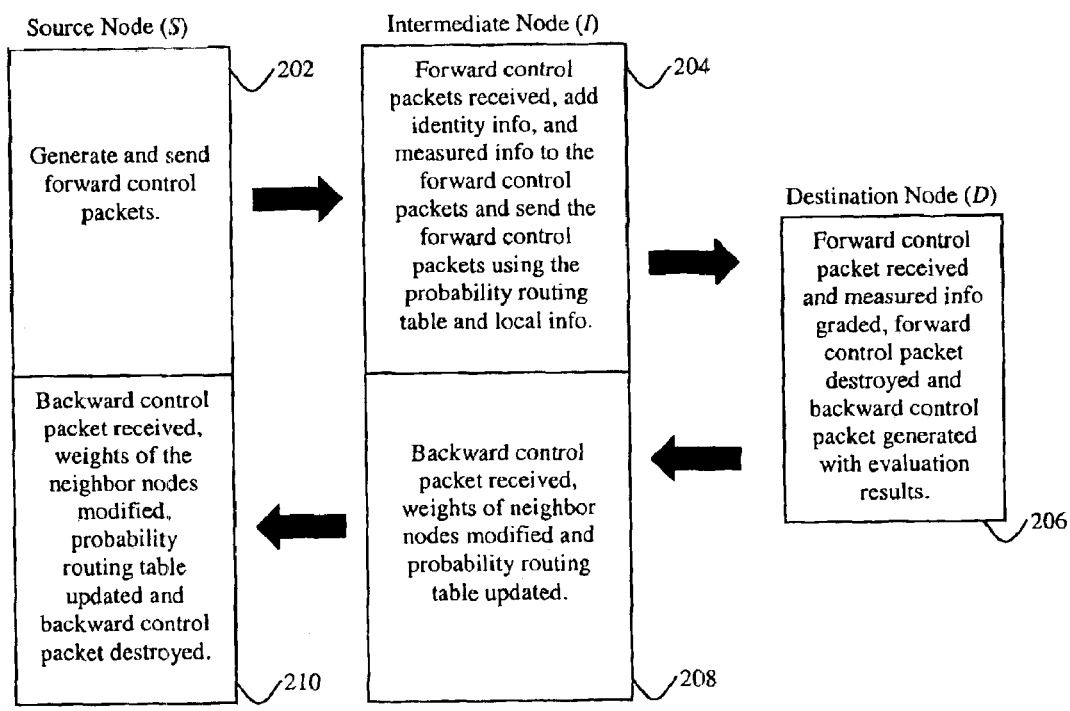
FIG. 2 is a flow chart describing Nodes' functions in the embodiment of the present invention.

FIG. 2 shows a flow chart describing Nodes' functions utilizing the PBRA of the present invention. In order to select a path to a D Node, an S Node generates FCPs and sends them randomly searching for this D Node at step 202. The rate of generation of the FCP is generally a function of network dynamics, data rate, time and the required ability to quickly respond to changes in the network. The FCPs are sent from the S Node to the D Nodes via I Nodes. Each I Node stores weights of its neighbors' Nodes. The values of weights affect the selection of the next Node to which the FCP travels. The I Nodes are randomly selected using PRTs as described herein. PRTs located at each Node have values calculated using the weight table and local information of the Node. The local information includes energy of the Nodes, bandwidth between the Nodes, signal to noise ratio between the Nodes, predicted delay between Nodes, estimated queuing delays, error rate of the packet transmission, power consumption of the links between Nodes, and combinations thereof. As the FCP moves in the network searching for the D Node, it uses the I Nodes' PRTs to determine which Node to visit next, as noted in step 204.

At I Node, when an FCP is received, this FCP will be forwarded to a neighbor Node. The selection of this neighbor Node is done randomly using the PRT discussed above. The values of the PRT are calculated using the weight tables and the local information. At Node I, the probability of selecting a neighbor Node J is:

$$\text{prob}(D, I, J) = \begin{cases} \dfrac{Fun(\tau_{D,I,J}, \eta_{I,J})}{\sum_{J \in N_I} Fun(\tau_{D,I,J}, \eta_{I,J})} & \text{if } J \in N_I \end{cases}$$

$$\text{prob}(D, I, J) = 0 \quad \text{if } J \notin N_I$$

where $\eta_{I,J}$ is the local value of the link (I,J). This value can represent the neighbor Node's information such as the neighbor Node's queue delay, remaining battery energy, link's signal to noise ratio, bit error rate, etc.

$Fun(\tau_{D,I,J}, \eta_{I,J})$ is a function of $\tau_{D,I,J}$ (the weight value of J Node at I Node corresponding to the destination D, here we will call it the weight on link (I,J)) and $\eta_{I,J}$ (the local heuristic information for link (I,J). $N_I$ is the set of all feasibly neighbor Nodes defined by the FCP's information and the routing constraints such as the guarantee of being free of loops. We use a special case for the function $Fun(\tau_{I,J}, \eta_{I,J})$:

$$Fun(\tau_{D,I,J}, \eta_{I,J}) = w_1 \tau_{D,I,J} + w_2 \eta_{I,J}$$

For Destination D:
the probability of selecting link (I,J) will be $$\text{prob}(D, I, J) = \begin{cases} \dfrac{w_1 \tau_{D,I,J} + w_2 \eta_{I,J}}{\sum_{J \in N_I} w_1 \tau_{D,I,J} + w_2 \eta_{I,J}} & \text{if } J \in N_I \end{cases}$$

$$\text{prob}(D, I, J) = 0 \quad \text{if } J \notin N_I$$

where $w_1$, $w_2$ are the multipliers of the neighbor Node's weight and the neighbor Node's local information respectively. The I Node inserts its identification "I" in the FCP and it adds and/or modifies the FCP measured information, such as values of the parameters mentioned above.

Every time the FCP reaches an I Node, it collects the identity information and the measured information of that I Node. The measured information is the values of parameters. Parameters include local information and additionally include the global information of the Nodes from S Node to D Node. Parameters are predetermined characteristics or units of measures of the Nodes, which are measured to determine the weights of a Node, including the local information and global information of the Nodes from the S Node to a D Node. Parameters are measured and constantly evaluated and assigned weight values for each Node. When a FCP reaches its destination, the measured information carried by this FCP, i.e., the parameters of the I Nodes it has visited, will be evaluated or graded using the following function:

$$\text{grade} = Fun(\text{QOS\_parameters})$$
$$= Fun(\text{distance from source to destination, Nodes energy,}$$
$$\text{links bandwidth, end to end delay, signal to noise ration,}$$
$$\text{error rate, power consumption of the lines, etc.})$$

end to end delay, signal to noise ration, error rate, power consumption of the lines, etc.)

These parameters are collected from FCP measured information. The FCP will be destroyed and a BCP will be generated at the D Node at step 206. The Evaluation result of the corresponding FCP is transmitted via the BCP. The BCP goes backward from the D Node to S Node visiting the same Nodes previously visited by the corresponding FCP. As BCPs are received by the I Nodes, they modify the weights of their neighbor Nodes, based on the evaluation result carried by the BCP and accordingly update their routing tables as shown in step 208 of figure 2. Finally, the S Node at step 210 eventually receives the BCPs, modifies the weights of its neighbor Nodes, updates its PRT and destroys the BCP. In one embodiment of this invention, the S Node can begin to start sending sender's intended message information to the D Node by using the best route selected from the routing information received from the BCP. FCPs and BCPs can be sent using a priority queue to minimize any loss or delay of network information due to congestion. Functions of each type of Node and the process will be described in more detail below.

Figure 3A:
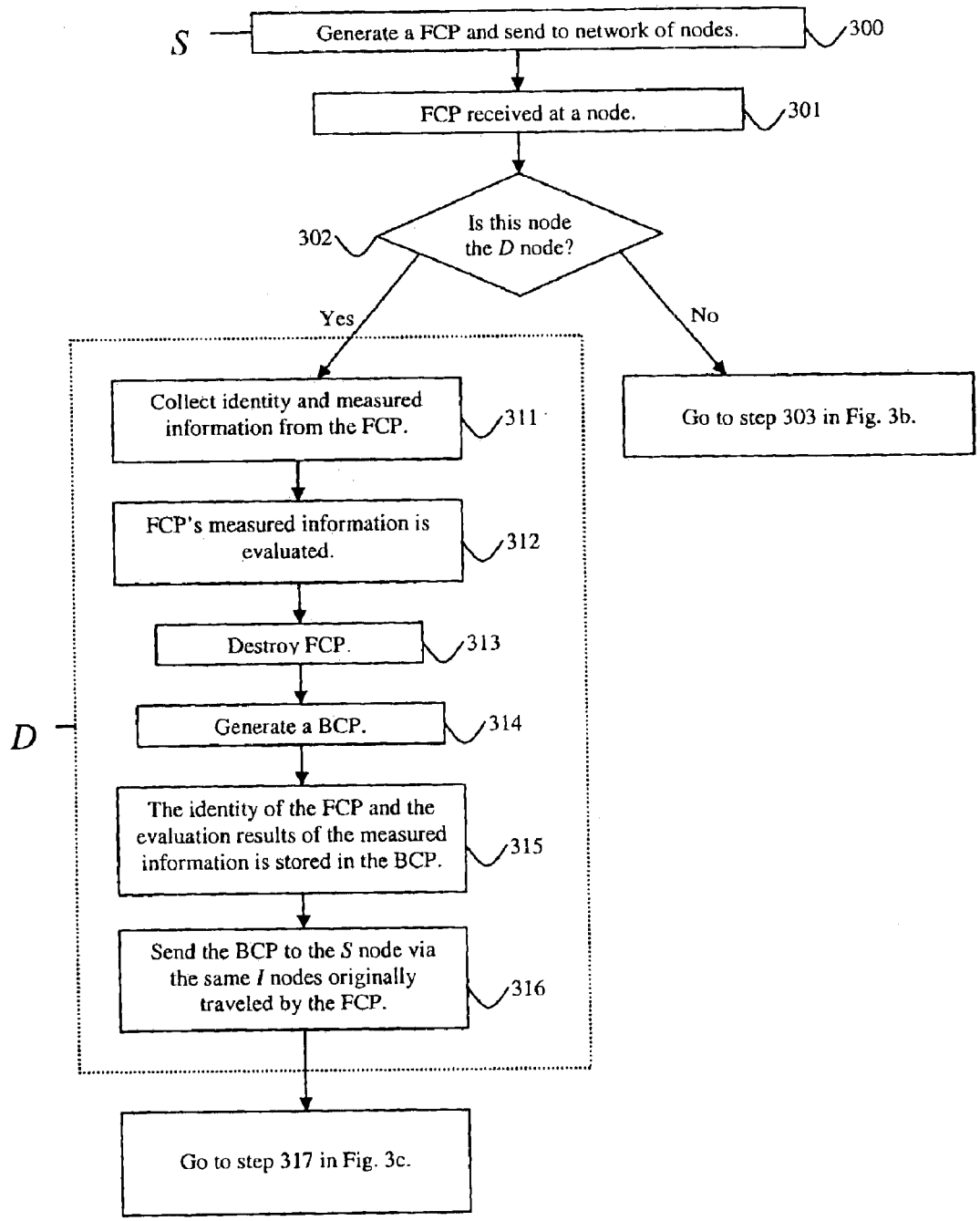
FIG. 3 is a flow chart describing functions of the intermediate and destination Nodes in reception of forward control packets and functions of the intermediate and source Nodes in reception of backward control packets and negative backward control packets in the embodiment of the present invention.
Figure 3B:
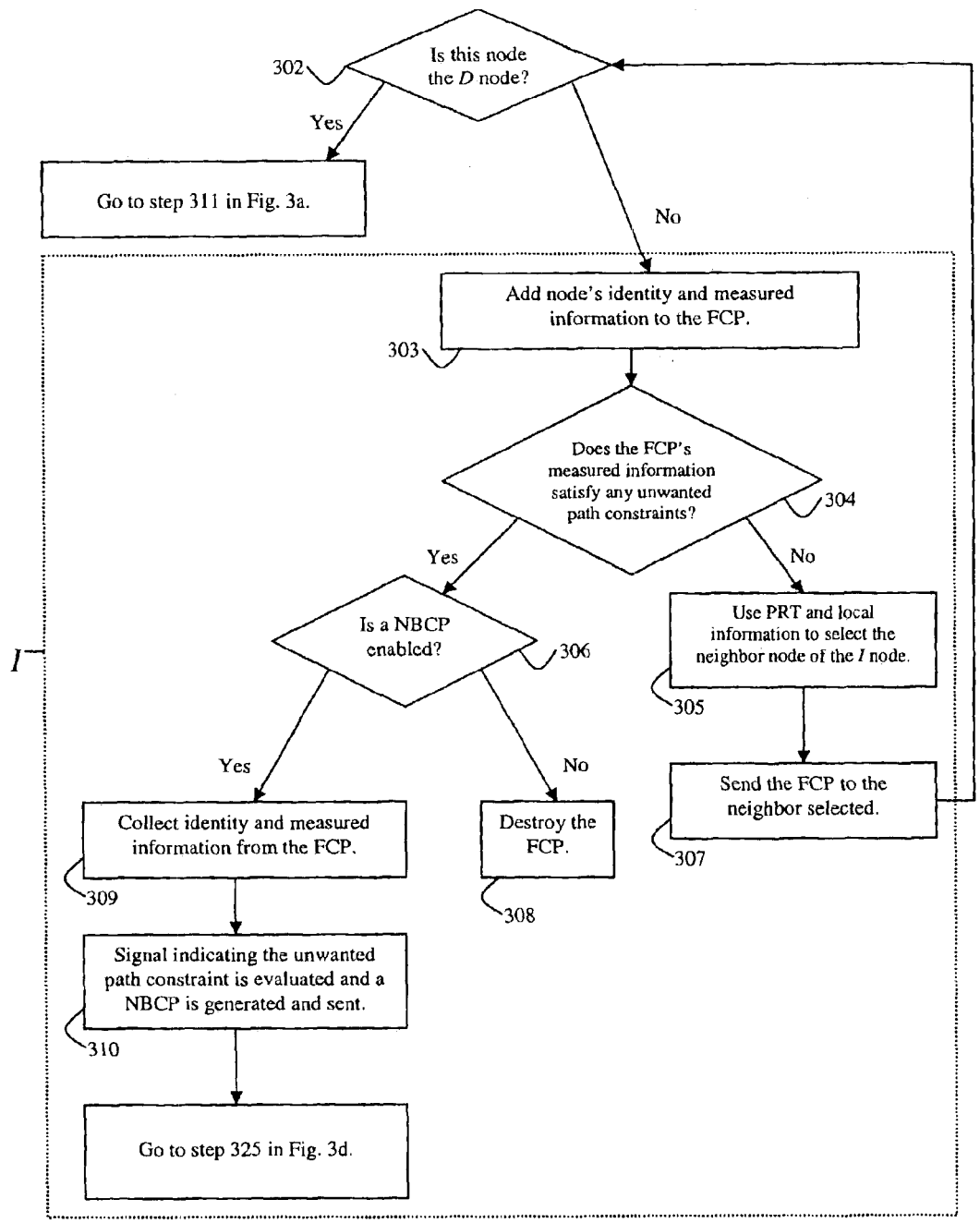

The response of the Nodes 12 when receiving a FCP depends on whether this Node is a D Node, an I Node or a S Node. Both I and S Nodes respond to the FCPs in the same way, by forwarding the FCP to a next neighbor selected randomly by the PRT. The flowchart in FIG. 3a shows detailed functions of the I Nodes and the D Nodes when receiving FCPs. Beginning with step 300, an FCP is generated and sent from the S Node to the network of Nodes. At step 301, an FCP is received at a Node, where a determination is made, 302, as to whether the Node is a D Node.

If the Node is determined to be a D Node, the FCP's identity and measured information is collected at the D Node as noted in step 311. At step 312, each of the FCPs measured information is evaluated in accordance with one or more parameters, by comparing the measured information to a reference value of the parameters. The reference value can preferably be constant or can be dynamic and dependent on the measured information received from the FCPs. Then at step 313, the FCP is destroyed and a BCP is generated at the D Node as noted at step 314. These BCPs store evaluation results corresponding to each of the FCPs. At step 315, at the D Node, the identity of the FCPs and the evaluation results of the measured information is stored in corresponding the BCPs. Then at step 316, the BCPs are sent back from the D Nodes to the S Nodes through the same I Nodes originally traveled by the FCPs to the S Node. The role played by the BCP is referred to in FIG. 3c as described below.

Figure 3C:
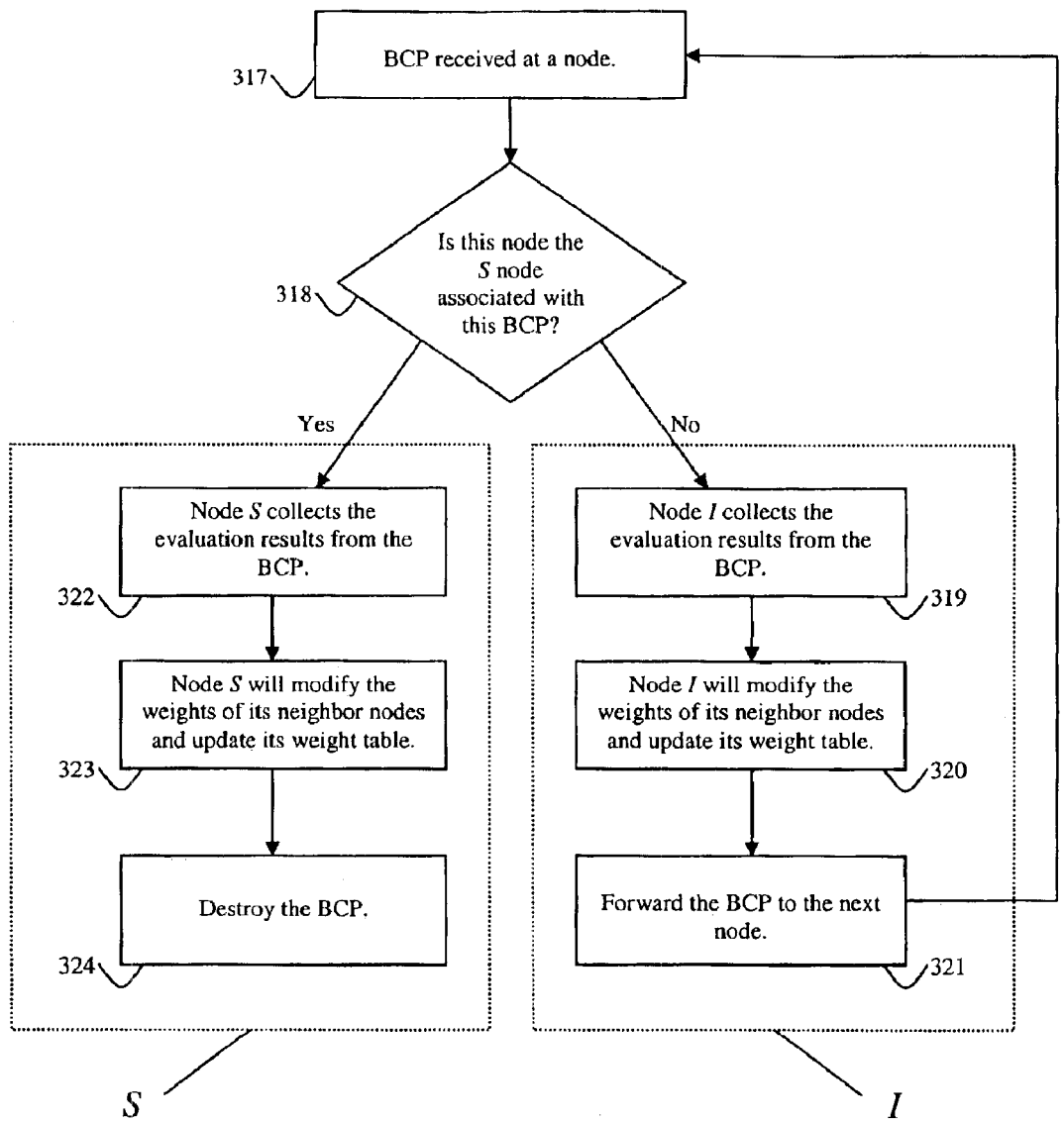

Referring to FIG. 3c, there is shown a flow chart describing the S and I Nodes' function of receiving BCPs sent at step 316 in FIG. 3a. Beginning at step 317, a BCP is received at a Node. At step 318, it is determined whether this Node is an S Node. If it is not an S Node, then it is an I Node and the I Node collects the evaluation results from this BCP at step 319. This evaluation result will be used to modify the weight values of the neighbor Nodes at each of the I Nodes at step 320 and hence updating the weight table entry corresponding to the FCP's destination. The weights of each of the neighbor Nodes of the I Nodes are modified based on the evaluation results stored in the BCPs. These modified weights correspond to the destination. In other words, they reflect the route to be chosen or maintained to reach the destination. The BCP will then be sent to the next Node at step 321 in the reverse path of the FCP. In other words, the BCP storing evaluation results follows the reverse path of its corresponding FCP visiting the same I Nodes originally visited by the FCPs to the source. At this point, steps 317 and 318 will be repeated. However, if it is determined that the Node is a S Node at step 318, then the S Node collects the evaluation results from the BCP at step 322 and modifies the weights of its neighbor Nodes, thereby updating its weight table at step 323. Finally, the BCP will be destroyed at step 324 at the S Node. In other words, when the BCP is received at the S Node, the weights of each of the neighbor Nodes of the S Nodes are modified based on the evaluation results stored in the BCPs. Based on the weights of its neighbor Nodes, the S Node selects a group of routes to the destinations via the I Nodes. Out of the group of routes, one route will preferably be an optimal route which is subject to change based on the change in the weights of the neighbor Nodes. The S Node could send data packets to the D Nodes via the selected group of routes including the optimal routing path.

Referring back to step 302 in FIG. 3a, if the Node is determined to be not a D Node, then steps 303 to 310 are performed at each of the I Nodes visited. At step 303, the identity information and measured information of the visited I Nodes are added to the FCPs. Then at step 304, it is determined whether a signal is received at I, i.e. whether the measured information of the FCP indicates any unwanted path constraints such as link failure, time to live reached, long route, loop detected, security alert, unidirectional links, etc. If not, then at step 305, the I Node's PRT and the local information are used to select a neighbor Node of the I Node, and the FCP is sent at step 307 to the neighbor Node selected at step 305. Steps 302 to step 307 are reiterated until the FCP reaches the D Node. Referring back to step 304 in FIG. 3, if a signal is received at I indicating that unwanted path constraints were found, a NBCP is generated. Step 306 verifies that the NBCP is generated. If the NBCP features is not enabled or generated, the FCP is destroyed at step 308. Otherwise at step 309, immediately upon receipt of the FCP at the I Node, the identity and measured information of the FCP is collected. Then at step 310, the signal indicating the unwanted path constraint is evaluated, and a NBCP storing evaluation results of the signal corresponding to the FCPs is sent back through the same I Node originally visited by the FCPs. The details of the unwanted path constraints and the evaluation results of the signal will be discussed with reference to FIG. 4, in detail later. The role played by the NBCP is referred to in FIG. 3d as discussed below.

Figure 3D:
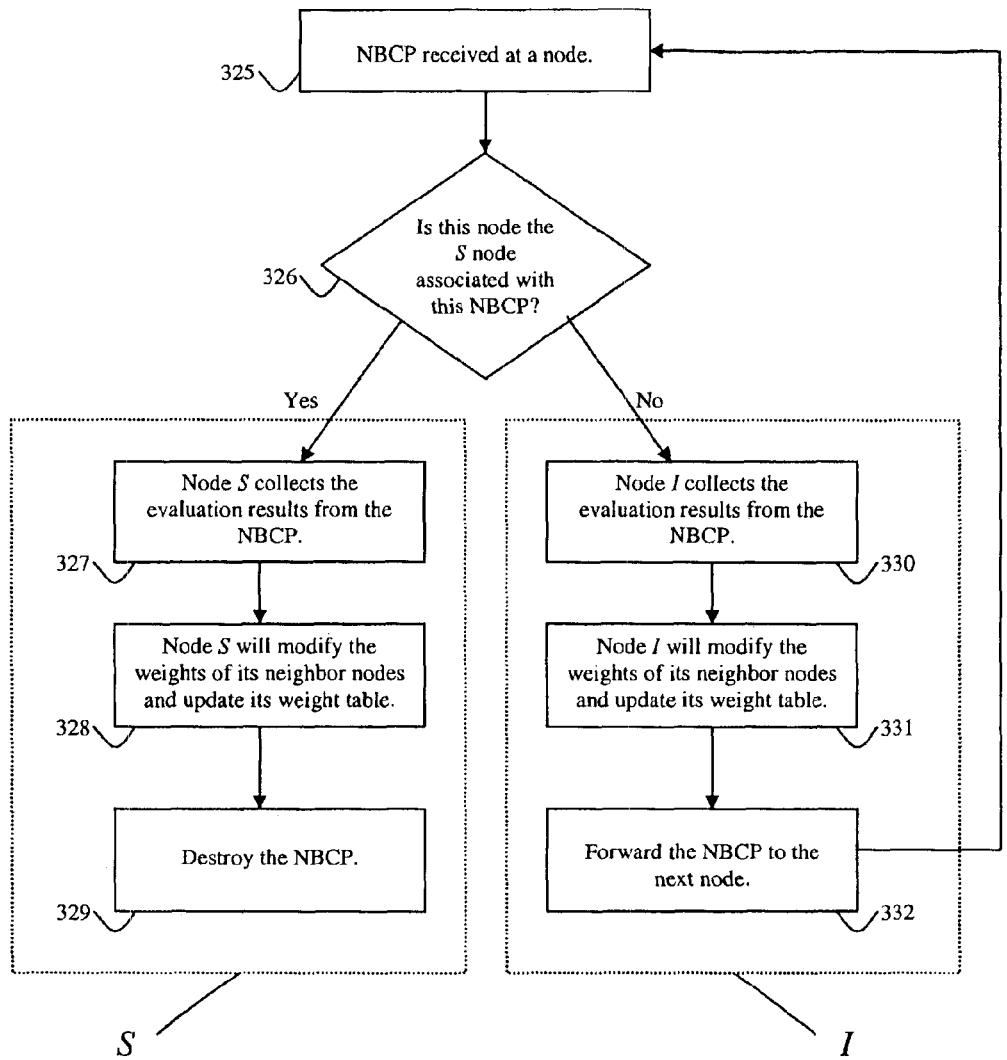

Referring to FIG. 3d, there is shown a flow chart describing the S and I Nodes' function of receiving NBCPs sent at step 310 in FIG. 3a. Beginning at step 325, an NBCP is received at a Node I. At step 326, it is determined whether this Node is an S Node. If it is not an S Node, the I Node collects the evaluation results from the NBCP at step 330. This evaluation result will be used to modify the weight values of the neighbor Nodes at each of the I Nodes at step 331, hence updating the weight table entry corresponding to the FCP's D Node. The weights of each of the neighbor Nodes of the I Nodes are modified based on the evaluation results stored in the NBCPs. These modified weights correspond to the D Node. In other words, they reflect the route to be chosen or maintained to reach the D Node. Since this I Node is encountered with NBCP, reflecting one or more unwanted path constraints, the weight value on the incoming link is decreased and the values on other links are increased using the weight updating function. The NBCP will then be sent to the next Node at step 332 in the reverse path of the FCP. In other words, NBCP storing evaluation results follows the reverse path of its corresponding FCP visiting the same I Nodes originally visited by the FCP to the S Node. At this point, steps 325 and 326 will be repeated. However, if it is determined that the Node is the S Node at step 326, then the S Node collects the evaluation results from the NBCP at step 327 and modifies the weights of its neighbor Nodes, thereby updating its weight table at step 328. Finally, the NBCP will be destroyed at step 329 at the S Node.

BCPs deposit either positive or negative weight values. Under normal operation, BCPs deposit positive weight values, thus increasing the weight of the routing path. A NBCP as discussed above, can be sent back to the S Node (similar to the "regular" BCP) when a signal received at I Node. The NBCP has the same format of the BCP, except that its evaluation result value is negative. The purpose of the NBCP is to help in excluding the unwanted constraints from the routing process or by accelerating the decay of weight values based on the evaluation result of the signal. Thus, the NBCP de-emphasizes this route, such that the probability of using this route by future FCPs will decrease.

As discussed above, signals of having unwanted path constraints such as link failure, long route, time to live reached, loop detected, security alert, unidirectional links, or combinations thereof preferably are received at an I Node. Upon receipt of such signal, it is evaluated and a NBCP is generated at the I Node. The NBCP storing the evaluation results of the signal is sent through the same route originally traveled by the I Nodes. The NBCPs are received at the I Nodes, and the weights of each of their neighbor Nodes are modified at each of the I Nodes based on the evaluation results stored in the NBCPs. Finally, the NBCPs are received at the S Nodes, and the weights of each of its neighbor Nodes are modified. Therefore, a NBCP has the same format of a regular BCP but with a negative evaluation result. NBCPs can be useful in overcoming some problems. Some of the ways in which the NBCPs can be used in is described in examples below.

For example, when a FCP's number of hops reaches its time to live (TTL) or experiences a loop, or any unwanted constraint, this FCP will be destroyed at this I Node and the I Node may send an NBCP. This NBCP will follow the reverse route of the FCP and will decrease the weight amount of corresponding FCP's path links. Thus, the probability of using this route by future FCPs will decrease and this unwanted route will be excluded quickly.

Another example is when the I Node detects link failure or link degradation, and this link had the highest probability in the probability routing table, this Node will respond to the next received FCPs by sending NBCPs. The probability of using this link will therefore decrease, and the probability of exploring new routes will increase.

Figure 4:
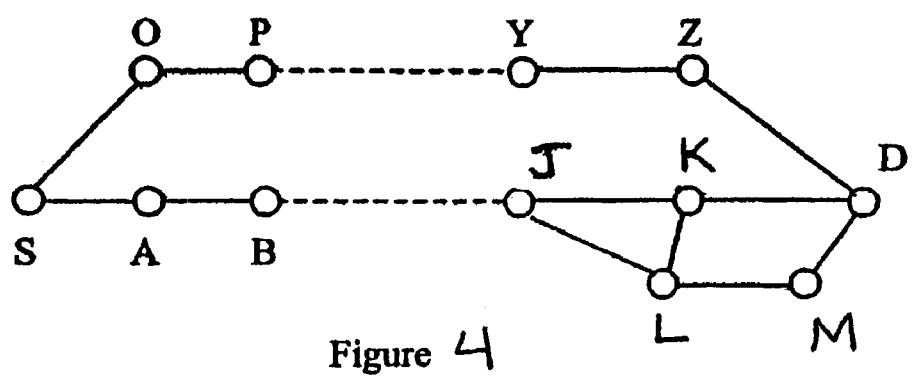
FIG. 4 is an illustration of various path links between Nodes from a source to a destination.

These examples are clearly illustrated in FIG. 4. Again, S is the Source and D is the Destination and the rest of the Nodes are intermediate/neighbor Nodes. Referring to FIG. 4, if an FCP sent from an S Node searching for a D Node experiences a loop (J, K, L, J), the loop is detected at Node J, a NBCP will be sent. The update corresponding to this NBCP will decrease the weight value on the links S-A, A-B, . . . J-K, K-L, L-M. If this decrease is high, the routing path S,A,B, . . . J will be quickly eliminated and the FCPs will switch to the routing path S,O,P, . . . Y,Z,D. If the decrease is less, the weight value on the links S-A, A-B, . . . J-K, K-L, L-M will decrease gradually. However, the probability that a FCP will select the routing path S,A,B, . . . J is not yet small. And there is a chance that a FCP will follow the routing path S,A,B, . . . J,K,D or the routing path S,A,B, . . . K,L,M,D.

Similarly, if the link J-K fails and when an FCP reaches Node J, a NBCP is generated to decrease the weight value on the links S-A, A-B, . . . J. The decrease should not be high to allow some FCPs to explore other routing path in the neighborhood. Now FCPs may find the routing path S,A,B, . . . J,L,K,D. The NBCPs with their negative evaluation results help to avoid the failed links or the loops and emphasize other neighboring links.

At an I Node, many BCPs generated from the same destination are received coming from different links. Several of these BCPs have the best evaluation result and others have lower evaluation results (unwanted results). The use of these lower evaluation results in updating the weight tables may affect the performance of the system by increasing the switching rate between routes and increasing the convergence time. Since BCPs may be arriving on various links at given Node, we need to minimize the frequency of switching between links and also minimizing the memory requirements. The window mechanism works as follows.

```
For a specific D Node
    For an I Node , for all incoming links (l₁,l₂,...,lₖ)
        Let ρ_D,j(K,n) be the Evaluation result carried by the nth
            received BCP coming
            from the neighbor Node j during window K.
        Let ρ_D,best(K) be the best Evaluation result in window K.
        Maximum Window size =W CPs.
        If ρ_D,j(K+1,n)<ρ_D,best(K)
            Continue monitoring
            w= w+1
            If w=W CPs
                Start new window (w=0)
                set ρ_D,best(K+1)= ρ_D,j(K,n)
                Update weights using ρ_D,best(K+1)
        Else
            Start new window (w=0)
            set ρ_D,best(K+1)= ρ_D,j(K+1,n)
            Update weights using ρ_D best(K+1)
```

The window size is variable up to a maximum of W CPs. The weight amounts on the links to the neighbors will be updated using this selected evaluation result $\rho_{D,best}$. Only the BCPs with an evaluation result greater than or equal to the last best evaluation result will be used for updating. This prevents using bad evaluation results for upgrading. If all the BCPs' evaluation results were used for updating, these unwanted results would affect the response of the system by increasing the convergence time and making incorrect and frequent switching between solutions.

Figure 5:
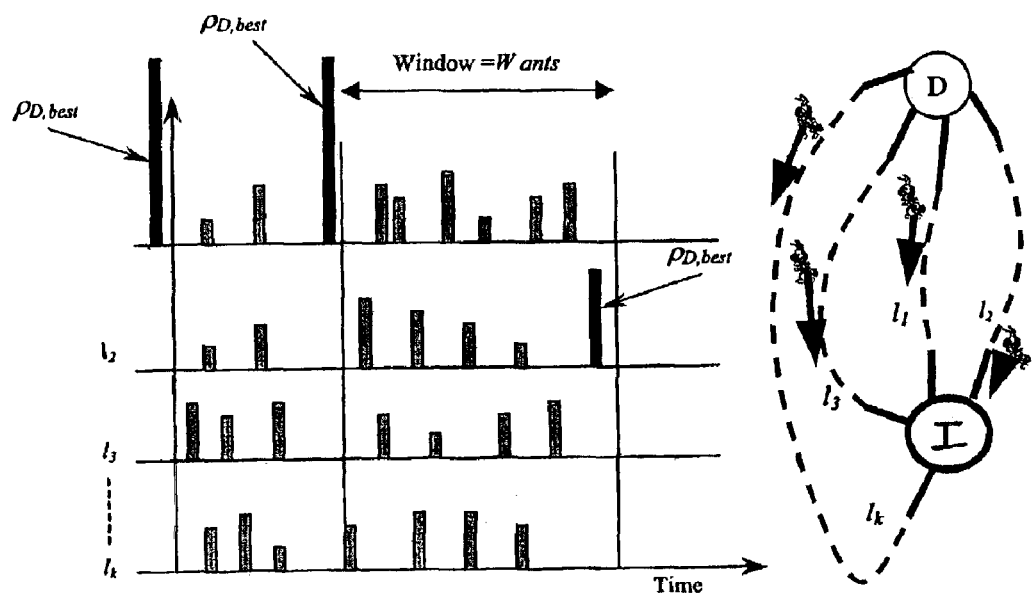
FIG. 5 shows a window mechanism of selecting the best control packet.

For example, as shown in FIG. 5, the I Node receiving BCPs from the D Node coming from different links $l_1, l_2, \ldots, l_k$. The use of unwanted evaluation results will slow the convergence. This can be shown in the first window of FIG. 5. If link $l_1$ is part of the best path, the use of unwanted evaluation results from BCPs received from other links will decrease the weight value of link $l_1$. This will increase the time that it takes for the weight value on the link $l_1$ to reach its highest value. In addition, there is a probability that the system will switch to solutions other than the best solution. The system may switch to link $l_3$ in the first window.

Without using this window mechanism, there will be a high probability for frequent and incorrect switching between routes. In FIG. 5, during the second window lifespan, none of the evaluation results received are higher or equal to the last best evaluation results, and the link $l_1$ is no longer a part of the best evaluation result. This allows the system to dynamically switch to the next best evaluation result link. If the system is too dynamic, the window size should be reduced to allow quick response. If we want to use all the BCPs, the window size should be equal unity.

Weight Updating:

The updating of weight is the modification of the values of the weight table. When the best BCP is received, the table entry, corresponding to the destination, will be updated using the BCP's evaluation result. In this invention, two updating techniques are briefly disclosed. First is a generalized S-ACO meta-heuristic technique and second is the periodic evaporation technique.

A generalized updating function for S-ACO meta-heuristic. In this function, the weight enforcement function as well as the weight evaporation function depends on the quality of the solution. Updating of the weight on the I Node's link to its neighbors will be done as follows:

At I Node, when best BCP is selected for updating as described above, the weight on the Node's links will be updating using the selected BCP's evaluation result $\rho_{D,i,j}$ using the following function:

$$\tau_{D,I,J}(n) = \begin{cases} f(\rho_{Dbest})\tau_{D,I,J}(n-1) + g(\rho_{Dbest}) & \text{link with } BCP \\ & \text{carrying } \rho_{Dbest} \\ f(\rho_{Dbest})\tau_{D,I,J}(n-1) & \text{Other links} \end{cases}$$

Where $\tau_{D,I,J}$ is the weight amount on the link between Node I and Node J corresponded to the destination D.

n is the number of received BCPs.

$g(\rho)$ is the evaporation function

The purpose of the evaporation function is to help the system forgetting the old information faster when the evaluation result $\rho$ is increasing Example of such function is $g(\rho) = 1-\rho$.

$f(\rho)$ is the enforcement function

The purpose of the enforcement function is to help the system increasing the amount of weight on the edges when the evaluation result $\rho$ is increasing. Example of such function is $f(\rho) = \rho^k$.

Note that: $0 \leq \rho \leq 1$, $0 \leq f(\rho) \leq 1$ and $0 \leq g(\rho) \leq 1$ Let $\tau_{D,I,J}(0)$ be the initial value of the weight on link (I,J) corresponding to D Node after n updates, $$\tau_{D,I,J}(n) \geq \begin{cases} (f(\rho_{Dbest}))^n \tau_{D,I,J}(0) + & \text{link with } BCP \\ g(\rho_{Dbest}) \sum_{l=0}^{n-1} (f(\rho_{Dbest}))^n & \text{carrying } \rho_{Dbest} \\ (f(\rho_{Dbest}))^n \tau_{D,I,J}(0) & \text{Other links} \end{cases}$$

$$\tau_{D,I,J}(n) \geq \begin{cases} (f(\rho_{Dbest}))^n \tau_{D,I,J}(0) + & \text{link with } BCP \\ g(\rho_{Dbest}) \frac{1-(f(\rho_{Dbest}))^n}{1-f(\rho_{Dbest}))} & \text{carrying } \rho_{Dbest} \\ (f(\rho_{Dbest}))^n \tau_{D,I,J}(0) & \text{Other links} \end{cases}$$

where n is the number of BCPs used for updating

As n increase, τ converge to $$\tau_{D,I,J}(n) = \begin{cases} \min\left(g(\rho_{DJ})\frac{1}{1-f(\rho_{DJ})}, \tau_{max}\right) & \text{link with } BCP \\ & \text{carrying } \rho_{Dbest} \\ \max(0, \tau_{min}) & \text{Other links} \end{cases}$$

Where $\tau_{max}$ is the maximum weight allowed on a link.

$\tau_{min}$ is the minimum weight allowed on a link.

Now, the links of the higher evaluation results will have higher weight values.

Periodic evaporation process helps the system to forget old information when some routes and links are not visited for long time. This process is described by the following equation:

$$\tau_{D,I,J}(t+\Delta t) = V(96_{I,J}(t))$$

where $\Delta t$ is the time interval between two periodic evaporation

V is the periodic evaporation function

Both $\Delta t$ and V depend on the network dynamics.

Figure 6:
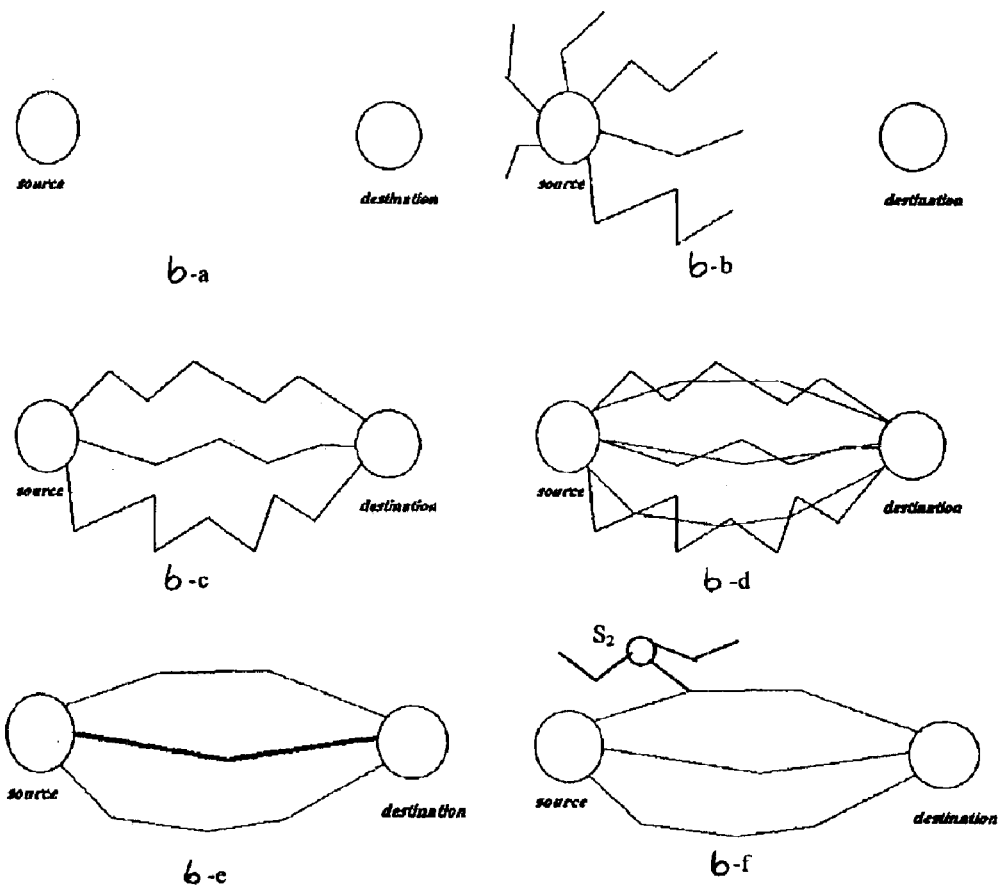
FIG. 6 shows a schematic elaboration of the function of the algorithm for mobile ad-hoc network.

FIG. 6 shows a schematic elaboration of how the algorithm works for mobile ad-hoc networks. Referring to FIG. 6-a the S Node is willing to establish communications with the D Node. The S Node will start sending FCPs as illustrated in FIG. 6b. These FCPs will move randomly in the network, searching for the D Node. A number of these FCPs will find the D Node as shown in FIG. 6c. The D Node sends BCPs on the reverse route. The weight on these routing paths' links will be increased. These routing paths will have higher weight amounts than the entire network. These routing paths may not be the best routing paths. Because of the probabilistic movement of the FCPs, the majority of FCPs will visit the regions around these routing paths and will find better routing paths as can be seen in FIG. 6d. The best routing paths will have the highest weight amounts on its links as shown in FIG. 6e.

If another Node ($S_2$) wants to find the same D Node as illustrated in FIG. 6f, it sends FCPs. These CPs move randomly in the network. If these FCPs intersect with an existing route to the destination, it will follow the weight on this routing path to reach the D Node because the amount of weight is higher in this routing path direction. The BCP will update the weight on the I Nodes. The FCPs generated from Node ($S_2$) are using the information in other Nodes' PRTs.

As a connection between S Node and D Node is used more, the connection will be closer to the optimum and more stable because more routing evaluation results are discovered. The majority of the FCPs are following the highest routing evaluation results. These routing evaluation results are used by data packets and should be quickly maintained. A lower number of FCPs are free to explore other routing paths and unvisited routes. The FCPs are sent using the already existing information in the I Nodes' PRT. This reduces the optimization time for a new routing path to be found and optimized. If a new routing path is required, the FCPs will find a near optimum solution and the optimization will start from a point closer to the optimum.

The PBRA starts working as on demand, the PBRA is dependent mainly on the random movements of the FCPs to find destinations, and the main effect of the FCPs is to find routing evaluation results to the D Node. The more D Nodes are explored by S Nodes, the more information the Nodes' routing tables have. After some time, the PBRA will depend mainly on the information saved in the PRTs of the Nodes.

Now the FCPs' main effect is updating the PRTs.

If only one parameter is used for optimization in the example shown in FIG. 6, it is the number of hops. The two hop routing path will be used until its Node battery is depleted. Then the PBRA will switch to the three hop routing evaluation result until its Nodes' batteries die; then the PBRA will switch to the four hop routing evaluation result. It is not fair to the minimum hop routing evaluation result in the sense of battery usage. And the battery should be used for optimization, in addition to the primary optimization parameter.

If the battery is considered as a parameter in the optimization, this network may respond as follows: if all the I Nodes starting from a point all their batteries remaining energy are equal, the two hop routing evaluation result has the minimum number of hops and it will be used. When the Nodes' battery energy in this routing path decreases and reaches some threshold, the three-hop routing evaluation result information will be better and the CPs and the message information will use this routing path. When its Nodes' batteries decrease, the CPs and the message information will switch to the four-hop routing path. When the Nodes' batteries in the four hop routing path decrease, the CPs and the message information will switch back to the two hops Node.

The usage of Node energy can be fair or the Nodes can be given different priority for energy usage. Important Nodes, such as data base servers, units used by high rank officers can report to the FCPs a lower battery energy than its actual value. If it reports low battery energy, the evaluation result of this routing evaluation result will be low, thus making it less desirable and increasing the lifetime of the Node.

As discussed above, the identity information and measured information is added to the FCPs. The measured information is the parameters we would like to optimize, such as quality of service parameters. We should be very careful in selecting the parameters to be collected. The more information collected about the Nodes, the more optimum the solution. However, the CPs' sizes will increase, which increases the routing overheads. These routing overheads in MANETs consume energy and part of the bandwidth and limits the scalability. A good solution for this is to calculate I Node local normalized Index $X_I$:

$$X_I = \sum_m a_m p_{I,m}$$

Where $X_I$ is Node's I normalized index $p_{I,m}$ is Node's I normalized optimization parameter m (quality of service parameters such as the number of hops, delay, battery, etc.) ($0<p_{I,m}<1$)

$a_m$ is the weight given to parameter $p_{I,m}$ indicating its importance in the optimization process where:

$$\sum_m a_m = 1$$

Note that $0<X_I<1$

As the Node gains a better parameter, the value XI become closer to unity. XI can take discrete values located between zero and one or they can be continuous. The threshold between two different steps of $X_I$ values can be controlled and it affects the switching speed between evaluation results.

Let $X_{path}$ be the path index for the FCP's path, which is a function of all the Nodes' information along the evaluation result. $X_{path}$ can be the multiplication of all the Nodes' indices for all the Nodes in the path.

$$X_{path} = \prod_I X_I$$

Note: $0 \leq X_{path} < 1$

The calculation of $X_{path}$ can be done in a distributed way in the I Nodes of the path. In this case, The evaluation result information $X_{path}$ can be only one field in the FCP, which will be modified as the FCP moves between I Nodes. The value $X_{path}$ gives a good indication for the number of hops. As the number of hops increases, the multiplication of $X_I$s decreases. $X_{path}$ is a good measure of the overall path information. Because of that $X_I$s and $X_{path}$ values is smaller than unity, the value of $X_{path}$ is smaller than the smallest local normalized parameter $(X_I)$ along the path.

At the destination, the evaluation result of the FCP from the S Node to the D Node is calculated. The evaluation results of the FCPs is done by comparing their measured information to a reference. This reference could change dynamically according to network changes. This reference can be the best $X_{path}$ received in the last window W. The window mechanism works as following:

For FCPs sent from S Node:
When reaching the D Node, the measured information of the received FCPs will be compared to find the best received FCP measured information $X_{path,best}$ in the last window W.
The evaluation result of a received FCP is determined as follows:

Evaluation result $\rho$=Function $(X_{path}, X_{path,best})$ $$\rho_D = \frac{1}{\alpha(X_{Path,best} - X_{Path}) + \beta}$$

$\alpha$ Scaling constant, $\beta$ is a bias constant
$0 < \rho \leq 1$

The value of $(X_{path,best} - X_{path})$ indicates how far the received CP measured information is from the current best measured information determined so far. When $X_{path}$ is away from the $X_{path,best}$, the evaluation result will be lower. The PBRA will respond better to the network changes because the $X_{path}$ is compared to a dynamic reference $X_{path,best}$. $\alpha$ controls the range of the evaluation result $\rho_D$, as $\alpha$ increases the range of the evaluation result increases. $\beta$ drifts the evaluation result $\rho_D$ away from the high values and keeps it under unity. Applying the PBRA on the network results in the best routing path's links having the highest weight amounts in the network.

In the case of highly dynamic network, the amount of weight on the best path should be significantly higher than other paths. Because of that the number of FCPs available in a certain time period is limited, the difference in weight levels between the best path and other paths should not be high. This should be done to allow fair number of FCPs to explore paths other than the best path. The optimization of a more stable network can allow higher number of FCPs on the best path and lower number on other paths. The best path will be maintained better and more stable. This can be achieved by making the weight on a path's link more distant another path's links and making the weight on the best path's links higher. In both cases, best path is achieved by selection of the parameters such as $\alpha, \beta$ which controls the evaluation results' range, and the differences between evaluation results, and the selection of the enforcement function $g(\rho)$ which controls the differences between the weight values of different paths with different evaluation results. When the best path fails, the FCPs find an alternate way by using the PRT, without the need to wait for a setup time. This new path may not be the optimal one. However, the number of FCPs using failed evaluation results are free, and the number of FCPs searching for the best routing evaluation result will increase, and the best path will be found eventually.

The path's links have weight amounts that are dependent on the path's evaluation results. In the case when the best path links have significantly higher weight than other links. Sending the message information packets following the highest weight amounts has some limitations. The best-found path has a very high weight amount and most of the FCPs follow this path. The other paths may not be visited by enough number of FCPs and the next best path may not be the optimum. A better path may exist, but it may not be found. In fact, in some cases, when the best path fails, the message information packets will follow the highest weight path, which may lead to a loop or very long path, however the number of FCPs allowed to explore the network will be higher and the next best will be found after some time. A number of the message information packets may be lost before this unfavorable path is eliminated. A number of the message information packets may fluctuate between different paths until reaching the best path.

In order to overcome these problems, an enhanced technique called pre-activated technique is proposed in a embodiment of the present invention. In this technique, rather than sending the message information packets following the highest weight amounts, message information packets will be sent using the best found path only. With this technique, when a better path is found, this path only will be activated to be used by message information packets. So, at the D Node, when a received FCP's path evaluation result is better than the best path found, the corresponding BCP activates the reverse route to be used by the message information packets. When this BCP reaches an I Node on the reverse path, this Node will use (activate) only the incoming link of the BCP for forwarding the message information packets. The message information packets will use only the activated path, which is the best path.

When a better solution is found, it will be activated for the message information packets and the message information packets will switch to this better path. This technique can find a near optimal solution. In this technique, the message information packets are not following the highest weight deposits. The message information packets are following a pre-activated path. There is no need to use very high weight on the best path or to have a large difference between different evaluation results and this allows the FCPs more freedom to explore the entire network. If a pre-activated path fails, the PBRA may take time to detect this failure and to activate to the next best path. In this period, the I Node will forward the message information packets to the highest weight links. When the next best path is found, this path will be activated, and data will use this path only.

Figure 7:
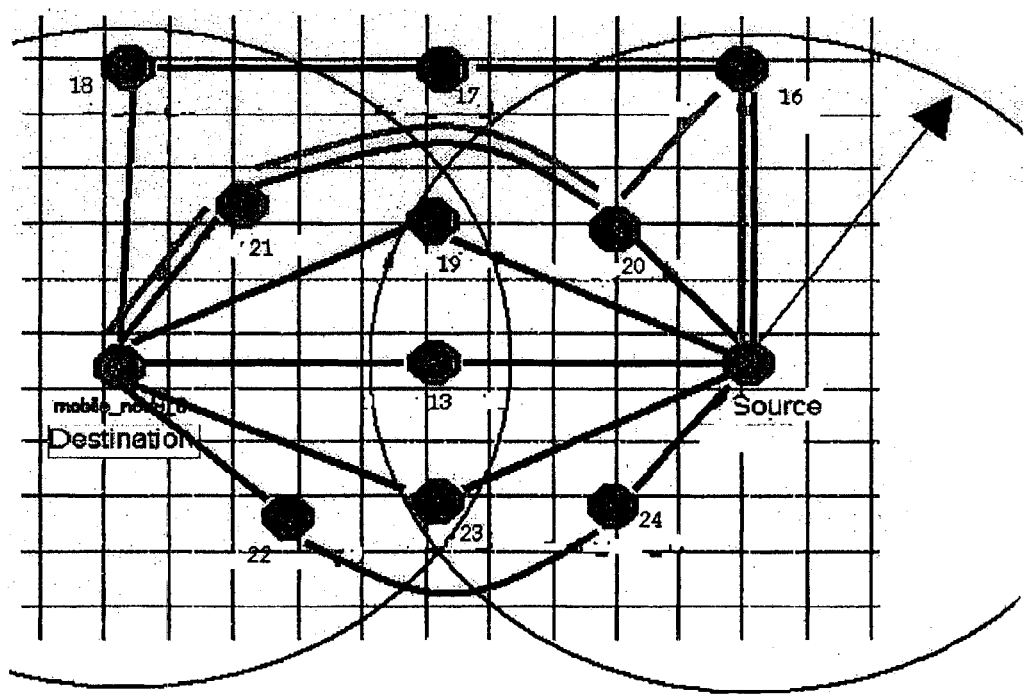
FIG. 7 illustrates a network of Nodes finding the best path using the probability based routing algorithm.

FIG. 7 illustrates a network of Nodes sending data using the pre-activated technique discussed above. The network has twelve Nodes. Every Node's communication range is 300 m. There are may possible paths from the S Node to the D Node. The marked line paths on the figure are the feasible paths by the PBRA. Many paths such as path 1-16-20-21-0 marked by "-" is impossible to be used and is therefore eliminated by the PBRA. The path 1-20-21-0 is a part of the path 1-16-20-21-0. As Xpath is the multiplication of the path's $X_{Is}$, then $X_{path}$ of the path 1-20-21-0 is always greater than Xpath of the path 1-16-20-21-0.

Figure 8A:
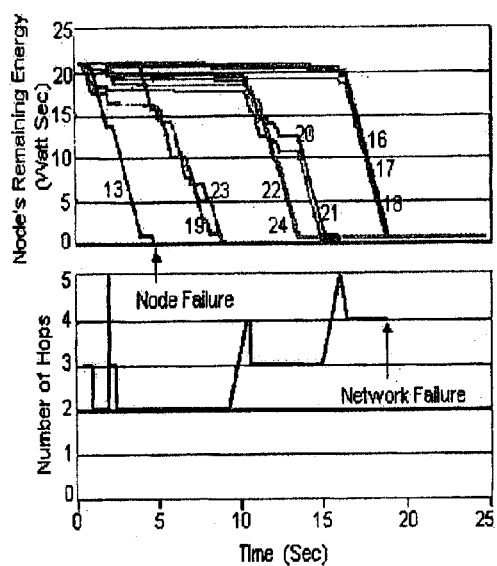
FIG. 8 is a graphical representation of simulation results for various scenarios to obtain an optimal routing path.
Figure 8B:
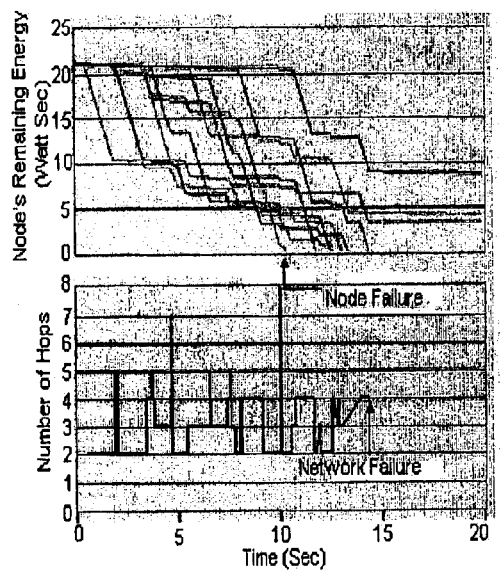

Referring to FIG. 8, there is shown simulation results for various scenarios to obtain optimal path. FIG. 8*a* shows the simulation results for scenario 1, i.e., optimizing only the number of hops while FIG. 8*b* represents scenario 2 results, i.e., optimization both number of hops and the Node remaining energy. By definition, Node failure is a Node in the network fails when its energy is depleted, and network failure is the network fails when there are no paths available to deliver data to the D Node due to energy depletion.

At the start of the simulation, all the I Node's batteries' energy is equal to 21 W.s. The simulation is run to simulate 25 minutes. FIG. 8 shows some network characteristics such as number of hops and Node remaining energy on the y-axis and the time on the x-axis. FIGS. 8*a* and 8*b* show the number of hops on the lower graph and the remaining battery energy for the I Nodes on the upper graph. Each line in the upper graph represents one of the I Nodes.

Looking at the results of scenario 1 in FIG. 8*a*, it is noted that the time till the first Node fails (due to battery depletion) is 5 minutes, while the time till the whole network fails (due to Node failures along all available paths between the S Node and the D Node) is 19 minutes. It should be apparent that optimization only the number of hops, leads to the initial utilization of Nodes along this optimized paths and thus their batteries' depletion. This effect propagates in other Nodes and eventually leading to network failure. When the network starts, this network is using the minimum number of hops (2-hops) paths, which is 1-13-0, 1-19-0, 1-23-0 as shown in FIG. 7. When the batteries of Nodes 13,19,23 of FIG. 7 are depleted, the network switches to next optimum paths (3-hops) 1-20-21-0, 1-24-22-0. When the batteries of Nodes 20,21,24,22 are depleted, the network switches to the next optimum path (4-hops) 1-16-17-18-0 as seen in FIG. 7. When the batteries of Nodes 16,17,18 are depleted, the network fails. So, regarding energy usage, the distribution between the Nodes that belong to the paths with lower numbers of hops, and the Nodes of higher number of hops paths is not fair.

In scenario 2 of FIG. 8*b*, the PBRA optimizes both the minimum number of hops and the battery usage. From the battery usage point of view, the PBRA distributes the selection of the optimized paths to grantee fair loading on the battery usage among all Nodes in the network. In the results of scenario 2 in FIG. 8*b*, it is noted that the first Node's failure time is 10 minutes, which is closer to the network failure time, which is 20 minutes. The remaining battery energy is more fairly distributed. The network starts by using the minimum number of hops paths. When these paths' batteries decrease to some degree, the measured information of paths with higher number of hops will be higher, and the network will switch to them. The network keeps switching between paths to fairly distribute the energy usage over the network's Nodes.

By comparing both cases, it is found that using the remaining battery lifetime in addition to the number of hops in optimization gives better performance. The first Node failure time is extended from 5 minutes to 10 minutes. The energy usage is fairly distributed across most of the Nodes. Most of the Node failure times are extended close to network failure time.

Figure 9:
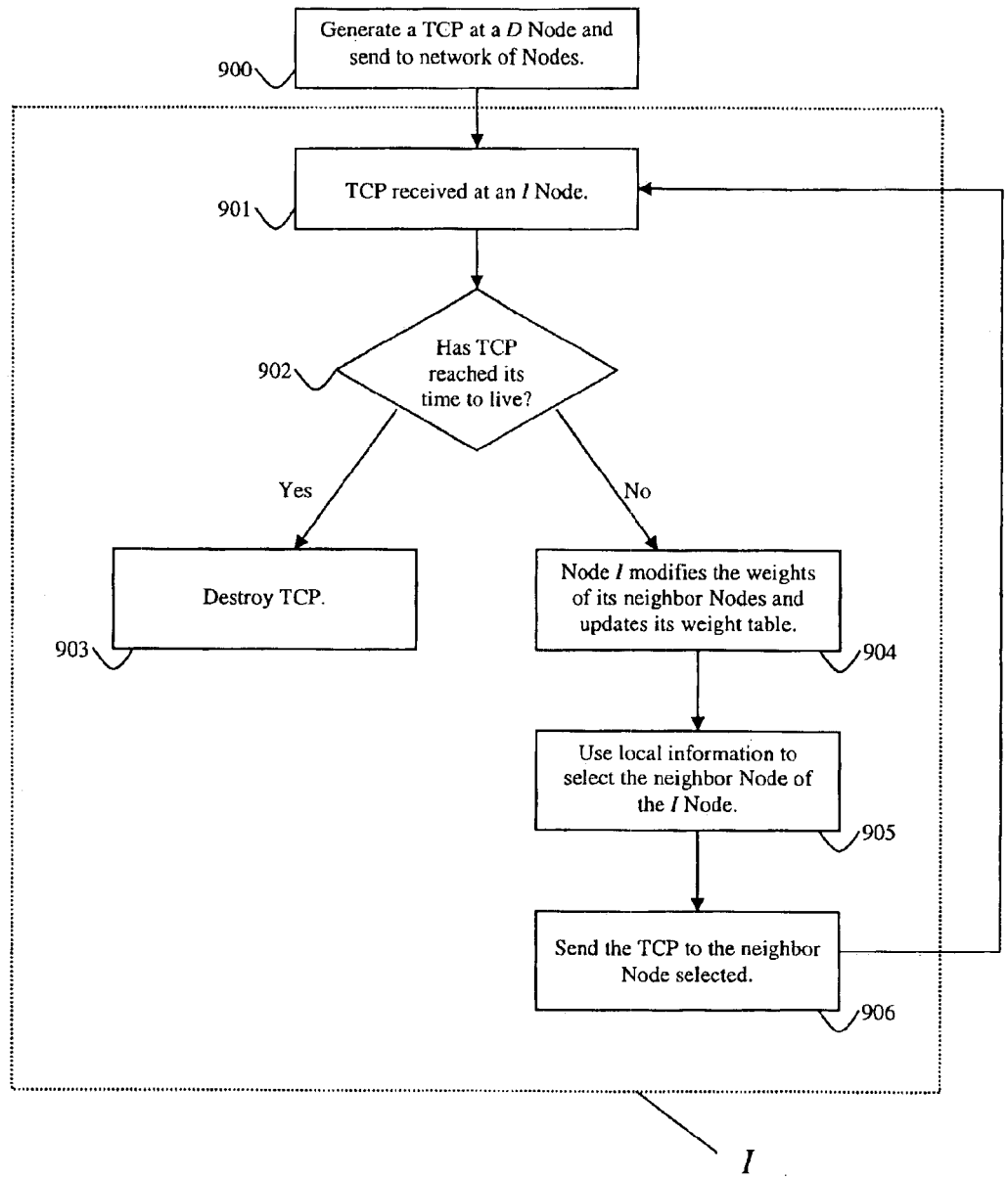
FIG. 9 is a flow chart describing functions of the Source and Intermediate Nodes in reception of trail control packets.

In another preferred embodiment of the present invention, new type of CPs called trail control packets (TCPs) are preferably used for biasing a routing process in an ad-hoc mobile network. When searching for a D Node, the FCPs may follow a very long path before reaching this destination. In fact, the worst case is to visit all the Nodes in the network before reaching the D Node. In addition, the first path found might be far from the best solution, and thus it may require a long time to reach the optimal path. This can be solved by using the TCPs. Referring to the flow chart of FIG. 9, TCPs are generated at a D Node and sent to the network of neighbor Nodes at step 900. These TCPs move randomly in the network modifying the routing information to favor the links which lead to the D Node. This increase is dependent on the local information of the I Nodes. After a few of these TCPs are sent in the network, the I Nodes' routing information will direct the FCPs towards this D Node.

Specifically, the I Nodes are randomly selected. When the TCPs are received at an I Node at step 901. At this visited I Node, it is checked whether the TCP reached its time to live (TTL) at step 902. If the TCP reached its TTL, then at step 903, the TCP is destroyed. If not, then at step 904, the weights of the neighbor Nodes of the visited I Nodes are modified and weight table is updated. The neighbor Node of the I Node is selected using the local information at step 905. Then at step 906, the TCP is sent or forwarded to the neighbor Node selected. Steps 901, 902, 904, 905 and 906 are repeated.

Moreover, based on the modified weights of the neighbor Nodes, a group of routing paths is found. These routing paths are found based on criteria of the weights of the neighbor Nodes for the corresponding I Node. The criteria may preferably be that weights are equal or greater than a value or have maximum weight. So, depending on which Nodes meet the criteria, the routing paths are identified and message information packets are sent from the S Node to the D Node based upon this selection. Preferably, an optimal routing evaluation result is also selected so message information packet can be sent upon selection of this optimal result.

While the invention has been described in relation to the preferred embodiments with several examples, it will be understood by those skilled in the art that various changes may be made without deviating from the spirit and scope of the invention as defined in the appended claims.

What is claimed is:

1. A method for selecting a routing evaluation result in an ad-hoc mobile wireless network having a plurality of Nodes including multiple sources and destinations, comprising:

sending from a source at least one forward control packet via at least one intermediate Node to one or more destinations at intervals of time, wherein said intermediate Node is randomly selected and each of the intermediate Nodes storing weights for each of its neighbor Nodes;

evaluating each of said forward control packets at said destinations in accordance with one or more given parameters;

sending from the destination backward control packets storing evaluation results which correspond to each of the forward control packets, through the same intermediate Nodes originally traveled by the forward control packets to the source;

receiving the backward control packets at the intermediate Nodes;

modifying the weights of each of said neighbor Nodes at each of the intermediate Nodes based on the evaluation results stored in the backward control packets;

receiving said backward control packets at said source Nodes;

modifying the weights of each of said neighbor Nodes at the source Node based on the evaluation results stored in the backward control packets; and selecting a group of routing evaluation results to said destinations via said intermediate Nodes based on the modified weights of said neighbor Nodes.

2. The method of claim 1 further comprising:

sending data packets from the sources to the destinations via said intermediate Nodes upon selection of said group of routing evaluation results.

3. The method of claim 1 further comprising:

selecting an optimal routing evaluation result to said destinations via said intermediate Nodes based on the modified weight of said neighbor Nodes.

4. The method of claim 3 further comprising:

sending data packets from the sources to the destinations via said intermediate Nodes upon the selection of the optimal routing evaluation result.

5. The method of claim 3 wherein said group of routing evaluation results are selected as next best routing evaluation results after the optimal routing evaluation result.

6. The method of claim 1 wherein said parameters include distance from the source to the destination, energy of the Nodes, bandwidth between the Nodes, signal to noise ratio between the Nodes, delay between Nodes, error rate of the packet transmission, power consumption of the links between Nodes, or combination thereof.

7. The method of claim 1 further comprising:

adding identity information and measured information of the intermediate Nodes to the forward control packets; wherein the measured information comprises values of said parameters.

8. The method of claim 7 further comprising:

receiving from the forward control packets the identity and the information of the intermediate Nodes at said destinations; and comparing the measured information to a reference value of the parameters.

9. The method of claim 8 wherein said reference value is constant.

10. The method of claim 8 wherein said reference value is dynamic and dependent on the measured information received from the forward control packets.

11. The method of claim 1 wherein said destination is a known destination.

12. The method of claim 1 wherein said destination is an unknown destination.

13. The method of claim 1 wherein the modified weights correspond to said destination.

14. The method of claim 1 wherein said intermediate Node is randomly selected using probability routing function.

15. The method of claim 14 wherein said probability routing function depends on said weights and local information.

16. The method of claim 15 wherein said local information include energy of the Nodes, bandwidth between the Nodes, signal to noise ratio between the Nodes, delay between Nodes, error rate of the packet transmission, power consumption of the links between Nodes, or combination thereof.

17. The method of claim 1, further comprising:

receiving a signal at the intermediate Node;

evaluating said signal and immediately upon receipt of the forward control packet at the intermediate Node, sending a negative backward control packet storing evaluation results of the signal, through the same intermediate Nodes originally traveled by the forward control packets;

receiving the negative backward control packets at the intermediate Nodes;

modifying the weights of each of said neighbor Nodes at each of the intermediate Nodes based on the evaluation results stored in the negative backward control packets;

receiving said negative backward control packets at said source Nodes; and modifying the weights of each of said neighbor Nodes at the source Node based on the evaluation results stored in the negative backward control packets.

18. The method of claim 17 wherein said signal includes link failure, long evaluation result, loop detection, security alert, unidirectional links, or combination thereof.

19. The method of claim 1 further comprising:

sending from a destination at least one trail control packet via at least one intermediate Node at intervals of time, wherein said intermediate Node is randomly selected and each of the intermediate Nodes storing weights for each of its neighbor Nodes;

receiving the trail control packets at the intermediate Nodes; and modifying the weights of each of the neighbor Nodes at each of the intermediate Nodes immediately upon receipt of the trail control packets at the intermediate Nodes.

20. A method for sending data in an ad-hoc mobile wireless network having a plurality of Nodes including multiple sources and destinations, comprising:

sending from a source at least one forward control packet storing the data to be routed, via at least one intermediate Node to one or more destinations at intervals of time, wherein said intermediate Node is randomly selected and each of the intermediate Nodes storing weights for each of its neighbor Nodes;

evaluating each of said forward control packets at said destinations in accordance with one or more given parameters;

sending from the destination backward control packets storing evaluation results which correspond to each of the forward control packets, through the same intermediate Nodes originally traveled by the forward control packets to the source;

receiving the backward control packets at the intermediate Nodes;

modifying the weights of each of said neighbor Nodes at each of the intermediate Nodes based on the evaluation results stored in the backward control packets;

receiving said backward control packets at said source Nodes;

modifying the weights of each of said neighbor Nodes at the source Node based on the evaluation results stored in the backward control packets; and sending the data to said destinations via said intermediate Nodes based on criteria of said weights of the neighbor Nodes for said intermediate Node.

21. The method of claim 20 wherein said criteria comprise weights equal or greater than a predetermined value.

22. The method of claim 21 wherein said criteria comprise maximum weight.

23. The method of claim 20 wherein said parameters include distance from the source to the destination, energy of the Nodes, bandwidth between the Nodes, signal to noise ratio between the Nodes, delay between Nodes, error rate of the packet transmission, power consumption of the links between Nodes, or combination thereof.

24. The method of claim 20 further comprising:
adding identity information and measured information of the intermediate Nodes to the forward control packets; wherein the measured information comprises values of said parameters.

25. The method of claim 24 further comprising:
receiving from the forward control packets the identity information and the measured information of the intermediate Nodes at said destinations; and
comparing the measured information to a reference value of the parameters.

26. The method of claim 25 wherein said reference value is constant.

27. The method of claim 25 wherein said reference value is dynamic and dependent on the measured information received from the forward control packets.

28. The method of claim 20 wherein said destination is a known destination.

29. The method of claim 20 wherein said destination is an unknown destination.

30. The method of claim 20 wherein the modified weights correspond to said destination.

31. The method of claim 20 wherein said intermediate Node is randomly selected using probability routing function.

32. The method of claim 31 wherein said probability routing function depends on said weights and local information.

33. The method of claim 32 wherein said local information include energy of the Nodes, bandwidth between the Nodes, signal to noise ratio between the Nodes, delay between Nodes, error rate of the packet transmission, power consumption of the links between Nodes, or combination thereof.

34. The method of claim 20 further comprising:
receiving a signal at the intermediate Node;
evaluating said signal and immediately upon receipt of the forward control packet at the intermediate Node, sending a negative backward control packet storing evaluation results of the signal, through the same intermediate Nodes originally traveled;
receiving the negative backward control packets at the intermediate Nodes;
modifying the weights of each of said neighbor Nodes at each of the intermediate Nodes based on the evaluation results stored in the negative backward control packets;
receiving said negative backward control packets at said source Nodes; and
modifying the weights of each of said neighbor Nodes at the source Node based on the evaluation results stored in the negative backward control packets.

35. The method of claim 34 wherein said signal includes link failure, long evaluation result, loop detection, security alert, unidirectional links, or combination thereof.

36. The method of claim 20 further comprising:
sending from a destination at least one trail control packet via at least one intermediate Node at intervals of time, wherein said intermediate Node is randomly selected and each of the intermediate Nodes storing weights for each of its neighbor Nodes;
receiving the trail control packets at the intermediate Nodes; and
modifying the weights of each of the neighbor Nodes at each of the intermediate Nodes immediately upon receipt of the trail control packets at the intermediate Nodes.

37. A method for sending data in an ad-hoc mobile wireless network having a plurality of Nodes including multiple sources and destinations, comprising:
sending from a source at least one forward control packet storing the data to be sent, via at least one intermediate Node to one or more destinations at intervals of time, wherein said intermediate Node is randomly selected and each of the intermediate Nodes storing weights for each of its neighbor Nodes;
evaluating each of said forward control packets at said destinations in accordance with one or more given parameters;
sending from the destination backward control packets storing evaluation results which correspond to each of the forward control packets through the same intermediate Nodes originally traveled by the forward control packets to the source;
receiving the backward control packets at the intermediate Nodes;
modifying the weight of each of said neighbor Nodes at each of the intermediate Nodes based on the evaluation results stored in the backward control packets;
receiving said backward control packets at said source Nodes; and
modifying the weights of each of said neighbor Nodes at the source Node based on the evaluation results stored in the backward control packets.

38. The method of claim 37 wherein said parameters include distance from the source to the destination, energy of the Nodes, bandwidth between the Nodes, signal to noise ratio between the Nodes, delay between Nodes, error rate of the packet transmission, power consumption of the links between Nodes, or combination thereof.

39. The method of claim 37 further comprising:
adding identity information and measured information of the intermediate Nodes to the forward control packets; wherein the measured information comprises values of said parameters.

40. The method of claim 39 further comprising:
receiving from the forward control packets the identity information and the measured information of the intermediate Nodes at said destinations; and
comparing the measured information to a reference value of the parameters.

41. The method of claim 40 wherein said reference value is constant.

42. The method of claim 40 wherein said reference value is dynamic and dependent on the measured information received from the forward control packets.

43. The method of claim 37 wherein said destination is a known destination.

44. The method of claim 37 wherein said destination is an unknown destination.

45. The method of claim 37 wherein the modified weights correspond to said destination.

46. The method of claim 37 wherein said intermediate Node is randomly selected using probability routing function.

47. The method of claim 46 wherein said probability routing function depends on said weights and local information.

48. The method of claim 47 wherein said local information include energy of the Nodes, bandwidth between the Nodes, signal to noise ratio between the Nodes, delay between Nodes, error rate of the packet transmission, power consumption of the links between Nodes, or combination thereof.

49. The method of claim 37, further comprising:

receiving a signal at the intermediate Node;

evaluating said signal and immediately upon receipt of the forward control packet at the intermediate Node, sending a negative backward control packet storing evaluation results of the signal, through the same intermediate Nodes originally traveled;

receiving the negative backward control packets at the intermediate Nodes;

modifying the weights of each of said neighbor Nodes at each of the intermediate Nodes based on the evaluation results stored in the negative backward control packets;

receiving said negative backward control packets at said source Nodes; and modifying the weights of each of said neighbor Nodes at the source Node based on the evaluation results stored in the negative backward control packets.

50. The method of claim 49 wherein said signal includes link failure, long evaluation result, loop detection, security alert, unidirectional links, or combination thereof.

51. The method of claim 37 further comprising:

sending from a destination at least one trail control packet via at least one intermediate Node at intervals of time, wherein said intermediate Node is randomly selected and each of the intermediate Nodes storing weights for each of its neighbor Nodes;

receiving the trail control packets at the intermediate Nodes; and modifying the weights of each of the neighbor Nodes at each of the intermediate Nodes immediately upon receipt of the trail control packets at the intermediate Nodes.

* * * * *

UNITED STATES PATENT AND TRADEMARK OFFICE
CERTIFICATE OF CORRECTION

PATENT NO. : 6,940,832 B2
DATED : September 6, 2005
INVENTOR(S) : Saadawi et al.

It is certified that error appears in the above-identified patent and that said Letters Patent is hereby corrected as shown below:

Column 13,
Line 19, now reads "=V(96 $_{IJ}$(t))...", and should read -- =V($\tau$ $_{IJ}$(t))... --.

Signed and Sealed this

Eighteenth Day of April, 2006

JON W. DUDAS
*Director of the United States Patent and Trademark Office*